United States Patent
Zanoni

[11] 3,961,838
[45] *June 8, 1976

[54] APPARATUS FOR PRODUCING A SCANNING LASER BEAM OF CONSTANT LINEAR VELOCITY

[75] Inventor: Carl A. Zanoni, MIddletown, Conn.

[73] Assignee: Zygo Corporation, Middlefield, Conn.

[ * ] Notice: The portion of the term of this patent subsequent to Dec. 10, 1991, has been disclaimed.

[22] Filed: Jan. 10, 1975

[21] Appl. No.: 540,079

[52] U.S. Cl............................. 350/7; 350/232
[51] Int. Cl.².......................... G02B 27/17
[58] Field of Search .................. 350/7, 6, 285, 289, 350/232, 202; 356/167; 178/7.6

[56] References Cited
UNITED STATES PATENTS

| | | | |
|---|---|---|---|
| 3,488,102 | 1/1970 | Buck et al............................... | 350/7 |
| 3,853,406 | 12/1974 | Zanoni.................................... | 350/7 |

Primary Examiner—John K. Corbin
Assistant Examiner—Jon W. Henry
Attorney, Agent, or Firm—Milton Zucker

[57] ABSTRACT

An opto-mechanical apparatus is described which produces a scanning laser beam moving with a constant linear velocity, where velocity is used in the vector sense. The scanned beam can be either collimated or focused. By reflecting a laser beam from a uniformly rotating mirror to produce a rotationally scanned beam of uniform angular velocity, locating said mirror at the focus of a specially designed lens which follows the formula $h = k \cdot \theta$, where $h$ is the distance between the center of the linearly scanned beam emerging from the lens and the optical axis, $\theta$ is the angle between the center of the rotationally scanned beam and the optical axis, and $k$ is a constant very nearly equal to the back focal length of the lens, a scanning laser beam is produced which moves with a uniform linear velocity.

7 Claims, 6 Drawing Figures

APPARATUS FOR PRODUCING A SCANNING LASER BEAM OF CONSTANT LINEAR VELOCITY

BACKGROUND OF THE INVENTION

1. Field of the Invention

The present invention relates to apparatus for producing a scanning laser beam of constant linear velocity, where velocity is used in the vector sense of both magnitude and direction. Specifically, the invention relates to opto-mechanical apparatus which is useful for the rapid and accurate non-contacting measurement of object dimensions, hole dimensions, object positions and sheet thickness.

2. The Prior Art

For the accurate measurement of the diameter, position, or thickness of soft, delicate, hot or moving objects, noncontacting sensors must be used. Prior art devices of this character include capacitive gauges, eddy-current gauges, air gauges, gamma- and X-ray gauges and optical sensors. Only the optical and nuclear gauges can work (with sufficient sensitivity) at distances greater than a small fraction of an inch. The nuclear gauges permit large working distances; however, they are extremely expensive and susceptible to systematic errors due to slight variations in the chemical composition of the object being measured.

Optical sensors have advantages due to the nature of light itself. The principal advantages are:

1. They do not require direct mechanical contact between the sensor and the object to be measured.
2. The distance from the sensor to the object to be measured can be large.
3. The response time is limited to that of the photodetector and its electronics; and
4. Light variations are directly convertible to electrical signals.
5. The measurements are independent of the chemical composition of the object.

Optical sensors desireably should utilize scanning light beams of uniform linear velocity. Prior-art optical sensors employ various techniques in attempts to produce such a scanning light beam. For example, U.S. Pat. No. 3,533,701 discloses an optical gauge wherein a light beam is scanned mechanically by a reflector prism attached to a belt. This technique aims to convert a uniform rotation into a uniform linear velocity. Nevertheless, it possesses two serious disadvantages. Firstly, since it depends on an elaborate arrangement of wheels, bearings, belts, and linkages, the accuracy and reliability are questionable for serious industrial use. Secondly, since it is necessary to move relatively massive parts, the scan speed is slow and, therefore, the duration of measurement is necessarily long. The longer the duration of measurement, the greater is the susceptibility to erroneous readings because of object vibration.

An example of an optical attempt to produce a uniformly moving beam can be found in U.S. Pat. No. 3,765,774, which discloses an optical measuring apparatus, wherein a laser beam scanned in a parallel fashion is used to measure the diameter of objects. In this disclosure, a laser beam which is reflected from a uniformly rotating mirror is converted into a rotary scanned laser beam. A scanner lens is positioned with its optical axis in the plane of the rotary scanned light beam and converts the rotary scanning light beam into a parallel scanning light beam. The scanner lens is a singlet of conventional design. The rotating mirror is placed at the back focal point of the lens. The lens brings the laser beam to focus at its front focal plane. Therefore, the linearly scanned beam does not move with constant velocity since a conventional collimator does not convert uniform rotation into uniform linear motion.

While these prior-art techniques for producing a linearly scanned light beam are useful for some measurements, they cannot be used for the accurate control of many industrial operations. For example, in the high-speed extrusion of aluminium rod, it is desirable to get readings with accuracies of 0.0001 inch. The extruded rod moves in every direction as it comes out of the die so that the sensor must be capable of fast, accurate measurements over a large measurement of volume, i.e., several inches on a side, and with a short measurement duration. The measurement of sheet thickness in a rolling mill is an example where a high sensitivity sheet thickness with a large working distance, large measurement range, and short measurement duration is required.

OBJECTS OF THE INVENTION

This invention aims to provide an improved apparatus for producing a scanning laser beam of constant linear velocity. The scanned beam of constant linear velocity can be either focused or collimated. This technique has broad utility in optical devices used to measure object diameters, sheet thickness, and object positions in a noncontacting manner.

Other objects of the invention will be apparent from the following description taken in connection with the accompanying drawings.

STATEMENT OF THE INVENTION

In accordance with the instant invention, I provide (1) a source of radiant energy, most preferably light from a laser, to produce a single narrow beam of collimated light; (2) means for reflecting said laser beam at a uniform angular velocity comprising for example a uniformly rotating mirror or reflecting polygon; and (3) means for converting said angularly scanned laser beam into a linear scanned laser beam of uniform velocity comprising a lens which satisfies the relationship $h=k \cdot \theta$, where h is the distance between the center of the linearly scanned beam and the optical axis of the lens, $\theta$ is the angle between the center of said rotationally scanned beam and the optical axis, and k is a constant very nearly equal to the back focal length of the lens; a scanning laser beam is produced which moves with a uniform linear velocity.

THE DRAWINGS

DETAILED DESCRIPTION OF THE INVENTION

Figure 1:
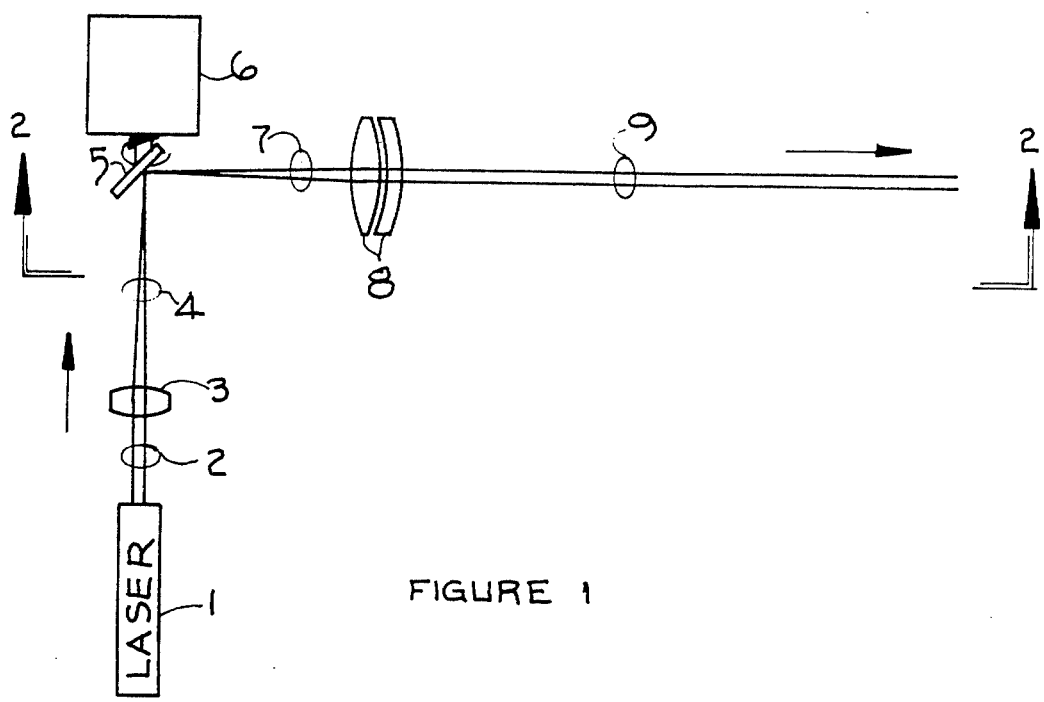
FIG. 1 is a schematic diagram showing a view of the opto-mechanical apparatus used to produce a scanning collimated laser beam of constant velocity.
Figure 2:
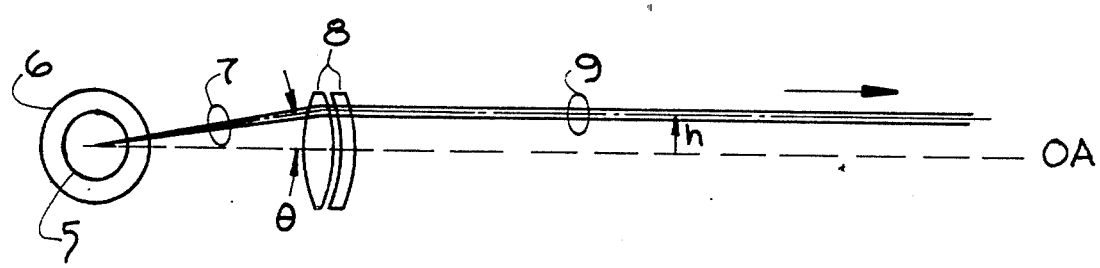
FIG. 2 is an orthogonal view of a section of the apparatus in FIG. 1, taken along the line 2—2 in FIG. 1.

Description and Explanation of FIGS. 1 and 2

While the technique has application for a wide range of radiation sources, the following description is taken by way of example with respect to an optical measuring system. The term "radiant energy" as used herein includes, but is not limited to, electromagnetic energy of all frequency ranges.

FIG. 1 is a schematic diagram showing a view of the optomechanical apparatus used to produce a scanning collimated laser beam of constant velocity.

FIG. 2 is an orthogonal view of a section of the apparatus in FIG. 1, along the line 2—2 in FIG. 1.

A light source such as a tungsten bulb, xenon bulb, light-emitting diode, laser diode, or other source of radiant energy and most preferably a gas laser 1, provides optical energy for a narrow, nearly collimated beam 2. Lens 3 brings the collimated beam 4 to focus on a uniformly rotating mirror 5. Mirror 5 is rotated uniformly by the electromechanical transducer 6, which is comprised of a motor and bearing assembly. The beam of light reflected by mirror 5 is converted to a diverging bundle 7 which is angularly scanned at a uniform speed in a plane orthogonal to the axis of rotation of mirror 5. Lens 8 recollimates the bundle 7 into the collimated bundle 9. In addition, lens 8 is specially designed so that the ray height is linearly related to the angle between the incident ray and the optical axis.

FIG. 2 is a sectional view of the apparatus of FIG. 1. $\theta$ is the angle between the optical axis, OA, of lens 8, and the center of bundle 7; $f$ is a number very nearly equal (within a percent or two) to the focal length of lens 8; and $h$ is the distance between the center of the scanning collimated beam 9 and the optical axis, OA. For a conventional collimating lens, $h = f \sin \theta$ or $\dot{h} = (f \cos \theta)\dot{\theta}$. Thus, even if $\dot{\theta}$ (the speed of the uniformly rotating beam) is a constant, $\dot{h}$ is a function of $\theta$, and therefore, the linear speed of the collimated beam, $\dot{h}$, is not constant over the aperture of the lens. Therefore, lens 8 must be a specially designed lens which satisfies the relation $h = k \cdot \theta$, where $k$ is a constant very nearly equal to the back focal length of the lens and $\theta$ is, of course, expressed in radians. For such a lens, $\dot{h} = k \cdot \dot{\theta}$, and a constant $\dot{\theta}$ implies a constant $\dot{h}$. To be useful, the scanning collimated bundle 9 must remain at a fixed angle with respect to the optical axis to a very high tolerance for all values of $\theta$ for which lens 8 receives the bundle 7. Therefore, lens 8 must be a high quality collimating lens specially designed to follow the $h = k \cdot \theta$ relation.

Such a lens is described and claimed in the copending Lawson U.S. application Ser. No. 493,339, filed July 31, 1974, for "Lens", and assigned to the assignee of the instant application.

Figure 3:
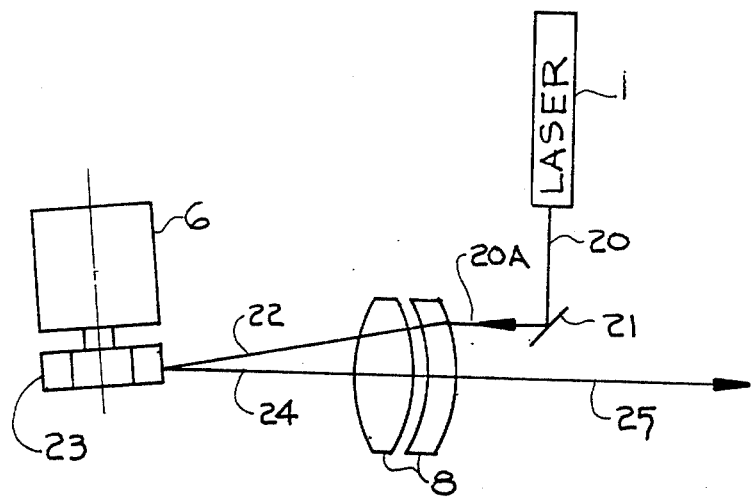
FIG. 3 is a schematic diagrams showing a view of a preferred embodiment of the opto-mechanical apparatus used to produce a scanning collimated laser beam of constant velocity.
Figure 4:
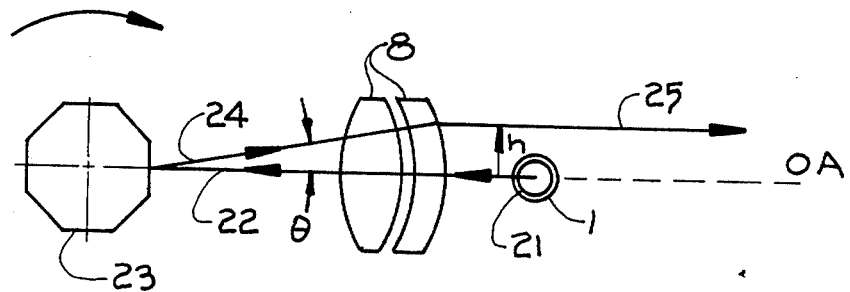
FIG. 4 is an orthogonal view of the apparatus in FIG. 3

Description and Explanation of FIGS. 3 and 4

FIG. 3 is a schematic diagram showing a view of a preferred embodiment of the optomechanical apparatus used to produce a scanning collimated laser beam of constant velocity.

FIG. 4 is an orthogonal view of the apparatus in FIG. 3.

In FIG. 3, the laser 1 provides a narrow, collimated beam 20, which is folded by mirror 21 to produce a beam 20A which is parallel to the optical axis of lens 8. Lens 8 focuses beam 20A onto the reflecting surface of the multifaceted reflector polygon 23. The polygon 23 is rotated at a uniform rate by the electromechanical transducer 6, which is comprised of a motor and bearing assembly. Polygon 23 is tilted slightly so that the reflected bundle 24 scans essentially across the diameter of lens 8. Lens 8 is a specially designed collimating lens of high quality which follows the relation $h = k \cdot \theta$. The axis of rotation of the polygon 23 is located on the optical axis of lens 8.

In FIG. 4, lens 8 is used to focus the collimated laser beam 20A onto the reflector polygon 23. Mirror 21 is not essential but facilitates the placement of the laser with respect to the rest of the apparatus. In the preferred embodiment, lens 8 performs the functions of lens 3 and lens 8 in FIG. 1. In order to increase the scan rate, and hence the duty cycle, rotating mirror 5 has been replaced by a rotating multifaceted reflector polygon 23.

Figure 5:
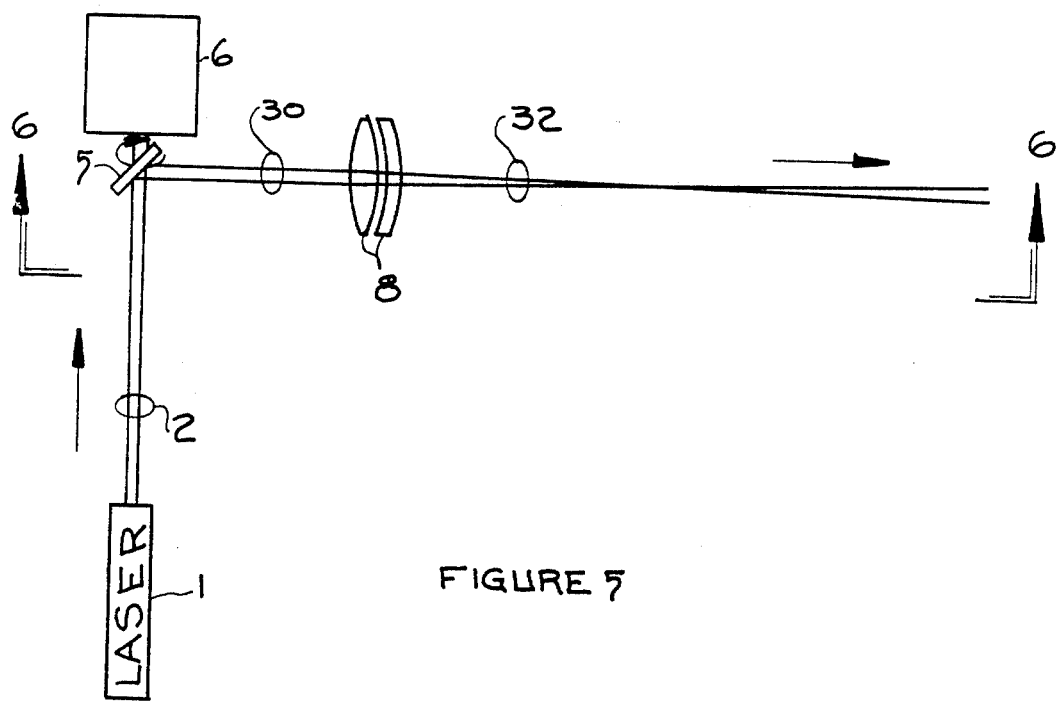
FIG. 5 is a schematic diagram showing a view of the opto-mechanical apparatus used to produce a focused scanning laser beam of constant velocity.
Figure 6:
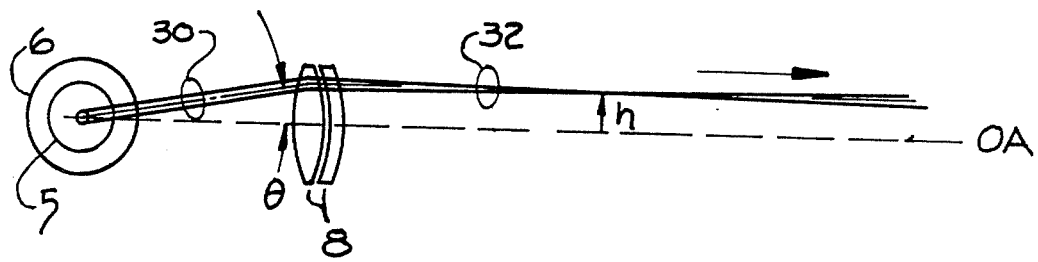
FIG. 6 is an orthogonal view of a section of the apparatus in FIG. 5, taken along the line 6—6 in FIG. 5.

Description and Explanation of FIGS. 5 and 6

FIG. 5 is a schematic diagram showing a view of the optomechanical apparatus used to produce a focused scanning laser beam of constant velocity.

FIG. 6 is an orthogonal view of a section of the apparatus in FIG. 5, along the line 6—6 of FIG. 5.

In FIG. 5, the laser 1 provides a narrow, collimated beam 2. The beam 2 is reflected by the uniformly rotating mirror 5. Mirror 5 is rotated uniformly by the electromechanical transducer 6, which is comprised of a motor and bearing assembly. The beam of light 30 reflected by mirror 5 is angularly scanned in a plane orthogonal to the axis of rotation of mirror 5. Lens 8 converts the collimated beam 30 into a focused linearly scanned beam 32. The linearly scanned, focused beam 32 will move with a constant velocity if lens 8 is a specially designed collimating lens of high quality which follows the relation $h = k \cdot \theta$.

Obviously, the examples can be multiplied indefinitely, without departing from the scope of the invention as defined in the claims.

What is claimed is:

1. Apparatus for producing a single scanning beam of radiant energy comprising (1) a source of radiant energy producing a single narrow collimated beam; (2) a uniformly rotating reflecting surface for reflecting said beam to produce a single angularly-scanned input beam of uniform angular velocity, which passes through (3) means for converting said single input beam into a linearly-scanning output beam of uniform linear velocity, said means comprising a lens which satisfies the relationship $$h = k \cdot \theta$$

where $h$ is the distance between the center of said output beam and the optical axis of said lens, $k$ is a constant very nearly equal to the focal length of the lens and $\theta$ is the angle between the center of said input beam and the optical axis of said lens.

2. The apparatus of claim 1, in which the radiant energy is light from a laser.

3. The apparatus of claim 1, in which said narrow collimated beam is reflected through said lens and emerges as a focused beam of uniform linear velocity.

4. The apparatus of claim 1, in which means are provided for focusing said narrow collimated beam onto said reflecting means, so that said input beam passes into said lens as a diverging bundle and emerges as a collimated scanning beam of uniform linear velocity.

5. The apparatus of claim 4, in which said lens is positioned to both focus said narrow collimated beam onto said reflecting means, and recollimate said angular scanned input beam.

6. The apparatus of claim 1, in which said reflecting means is a uniformly rotating mirror.

7. The apparatus of claim 1, in which said reflecting means is a uniformly rotating polygon.

* * * * *